(12) United States Patent
Nishikawa

(10) Patent No.: US 8,059,500 B2
(45) Date of Patent: Nov. 15, 2011

(54) OPTICAL DISC DEVICE

(75) Inventor: Toshihiro Nishikawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 484 days.

(21) Appl. No.: 12/289,269

(22) Filed: Oct. 23, 2008

(65) Prior Publication Data

US 2009/0109813 A1    Apr. 30, 2009

(30) Foreign Application Priority Data

Oct. 25, 2007    (JP) .................................. 2007-277213

(51) Int. Cl.
*G11B 21/08*    (2006.01)
(52) U.S. Cl. .................................. 369/30.18; 369/30.04
(58) Field of Classification Search .................. 369/47.1, 369/30.18, 30.04; 386/248, 240, 105
See application file for complete search history.

(56) References Cited

U.S. PATENT DOCUMENTS

| | | | | |
|---|---|---|---|---|
| 5,902,115 A | * | 5/1999 | Katayama | ..................... 386/240 |
| 6,574,422 B1 | * | 6/2003 | Kikuchi et al. | ............... 386/248 |
| 7,609,592 B2 | * | 10/2009 | Suzuki | ....................... 369/30.18 |
| 2006/0045482 A1 | | 3/2006 | Moritani et al. | |

FOREIGN PATENT DOCUMENTS

| | | |
|---|---|---|
| JP | 2004-213728 A | 7/2004 |
| JP | 2005-346911 A | 12/2005 |
| JP | 2006-066025 A | 3/2006 |
| JP | 2006-202402 A | 8/2006 |
| JP | 2007-080329 A | 3/2007 |

\* cited by examiner

*Primary Examiner* — Ali Neyzari
(74) *Attorney, Agent, or Firm* — Morgan, Lewis & Bockius LLP

(57) ABSTRACT

It is an object of the present invention to provide an optical disc device that achieves more accurate time search. Thus, in a DVD playback device including time search function of performing playback from specified time, control is performed so that, when the specified time for the time search has been inputted, playback inside the device starts from a top of a VOBU including the specified time, and outputting a video and an audio starts from time when a playback frame agrees with a frame corresponding to the specified time.

4 Claims, 7 Drawing Sheets

*PRIOR ART*

FIG.4

VTS_TMAPT

| NAME | CONTENTS | BYTE COUNT | ITEM |
|---|---|---|---|
| (1) TMU | TIME UNIT (SECOND) | 1 | |
| RESERVED | RESERVATION | 1 | |
| (2) MAP_EN_Ns | MAP-ENTRY COUNT | 2 | |
| (3) MAP_ENT | MAP-ENTRY TABLE | 4×MAP-ENTRY COUNT | MAP-ENTRY TIME INTERVAL ADDRESS OF VOBU OF EACH MAP-ENTRY DESTINATION |

*PRIOR ART*

OPTICAL DISC DEVICE

This application is based on Japanese Patent Application No. 2007-277213 filed on Oct. 25, 2007, the contents of which are hereby incorporated by reference.

BACKGROUND OF THE INVENTION

1. Field of the Invention

The present invention relates to an optical disc device including time search function of performing playback from specified time.

2. Description of Related Art

In recent years, as a video device recording and playing back videos and audios, an optical disc device is typically frequently used. As a recording medium of the optical disc device, there are recently a DVD (Digital Versatile Disc), a BD (Blu-ray Disc), and an HD DVD (High Definition DVD). Then one of features of the optical disc is that playback can be done quickly from a desired section. For this, various methods have been suggested.

For example, JP-A-2006-202402 discloses an information playback device and an information playback method including for each data unit a table where addresses of a plurality of data units to be played back within a time range including the current time are recorded. In these device and method, the number of data units to be interlace-played back in accordance with playback speed is obtained, it is judged whether the address in accordance with the obtained number in the table is valid or invalid, when the address is valid, playback is performed based on this valid address, and when the address is invalid, playback is performed based on a valid address in the addresses of the data unit to be played back at time closer to the current time than the playback time for the data unit with this invalid address.

JP-A-2007-80329 discloses a still image switching position search device for a disc provided with: a reading part for reading recording information from a disc where management information related to video data including a moving image or a still image recorded in a user data area; a judge part for receiving the management information read by the reading part, obtaining title information on the video data, and based on address data of a top video object unit in cell information forming each title, judging whether or not still image information is included in the video data; and a control part for, when the still image information is included, obtaining from the management information on playback position time of this still image information and controlling a display part to display on a display screen a title number of each still image information and time of its switching position thereof.

JP-A-2005-346911 discloses a recording device in which a system controller performs playback control based on address information which indicates video information to be actually played back in angle block playback or parental block playback, and which is included in VOB unit search information included in DSI data separated from a demodulated demodulation signal by a system buffer.

JP-A-2004-213728 discloses a DVD playback device which, when playback position is specified by time, reads C_PBTM where playback time for each cell included in PGCI is written, makes comparison with the specified time while sequentially adding each C_PBTM to detect a cell including the specified time, obtains a difference between the specified time and time at the top of the cell including the specified time, defines as a temporary VOBU number a value obtained by dividing the obtained difference by 0.5 and then adding 1 to the obtained value, reads C_ELTM where playback time of each VOBU included in the cell is written, adds together C_ELTM up to the obtained temporary VOBU number to obtain total elapse time, makes comparison with the specified time while adding or subtracting C_ELTM in accordance with VOBU numbers before and after the total elapse time to detect the VOBU agreeing with the specified time, and performs playback from a top address of the detected VOBU.

JP-A-2006-66025 discloses an optical disc reproduction device in which, upon time search request, a search destination address is determined based on analyzed search time, a navigation pack for the detected search destination address is obtained, when there is no video data in the obtained navigation pack, a top address of a front stage video object unit having video data is obtained from the data search information included in the obtained navigation pack, data of the obtained top address is read and only the video data is obtained based on general information of the data search information included in the navigation pack, and a still image corresponding to audio data is outputted.

In performing time search in conventional optical disc devices including those described in the above five publications, playback has been practiced from the top of a VOBU (video object unit) including time for search destination. It is because playback can be done only in units of VOBUs. Thus, when the time for search destination is located at the rear of the VOBU, playback is started at a position a maximum of approximately 0.5 seconds before specified time.

For example, assuming that when the time for the specified search destination is 1h00m00s00f (1 hour 0 minutes 0 seconds 0 frame), the top of a VOBU including this time is 0h59m59s17f, playback is started from there. At this point in time, when playback elapse time is OSD-displayed, playback for the OSD display is started in a state of 1h00m00s, and processing is performed so that the OSD display is updated to 1h00m01s when playback position at 1h00m01s00f has been reached. That is, time until when the OSD display at 1h00m00s is updated to 1h00m01s is actually one second or more.

As described above, conventionally, a difference between specified time and actual playback start time has been compensated by such processing that deludes OSD display. Therefore, accurate time search has not been necessarily achieved.

SUMMARY OF THE INVENTION

The present invention relates to an optical disc device that achieves more accurate time search.

To achieve the object described above, according to one aspect of the invention, an optical disc device including time search function of performing playback from specified time further includes a control part that, when the specified time for the time search has been inputted, causes playback inside the device to be started from a top of a VOBU including the specified time, and causes outputting a video and an audio to be started from time when time at playback position agrees with the specified time.

Here, the playback inside the device means reading at least video and audio data from an optical disc, and operations up to decoding may be performed.

With this configuration, the video and audio can be accurately outputted from the specified time.

Preferably, in the optical disc device with the configuration described above, when the time at the playback position agrees with the specified time corresponds to when a playback frame agrees with a frame corresponding to the specified time.

With this configuration, the video and audio can be outputted from the frame that accurately agrees with the specified time.

In the optical disc device with the configuration described above, the VOBU including the specified time may be calculated by using VTS_TMAPT.

In the optical disc device with the configuration described above, simultaneously with the start of outputting the video and audio, OSD indicating playback elapse time, which is equal to the specified time, is outputted to update the playback elapse time where necessary.

With this configuration, the user may visually confirm that the video and audio are accurately displayed from the specified time.

According to the invention, in time search control, by starting the playback inside the device from the top of the VOBU including the specified time and then starting the outputting of the video and audio from the time when the time at playback position agrees with the specified time, the video and audio can be outputted from the accurate specified time without compensating a difference between the specified time and the actual playback start time through such processing that deludes OSD display as has been practiced conventionally, thus permitting achieving more accurate time search. As a result, the sense of use improves, which can improve the user satisfaction level.

BRIEF DESCRIPTION OF THE DRAWINGS

FIG. 4 is a diagram showing a data recording example for VTS_TMAPT;

DETAILED DESCRIPTION OF PREFERRED EMBODIMENTS

Figure 1:
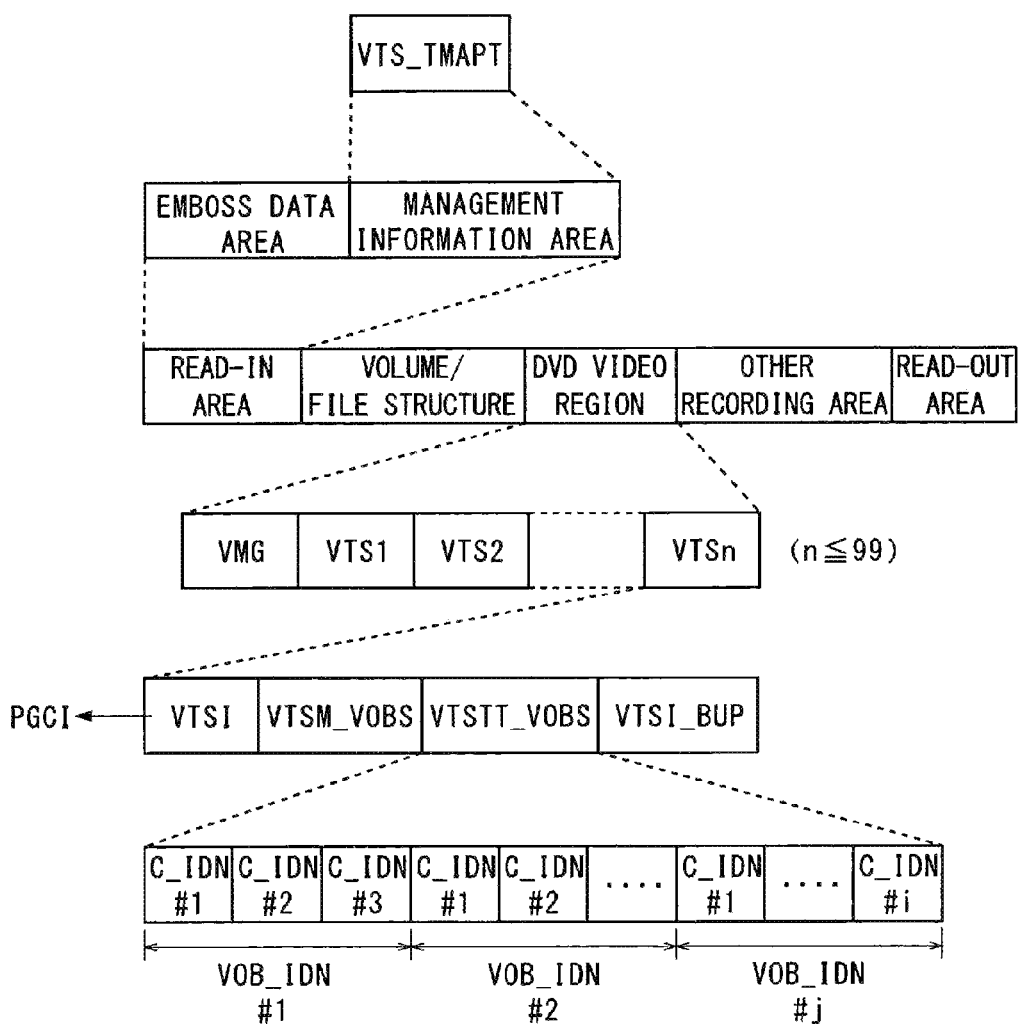
FIG. 1 is a diagram illustrating hierarchical structure of information recorded on a DVD.

Hereinafter, the embodiment of the present invention will be described, referring to an example of a DVD as an optical disc. FIG. 1 is a diagram illustrating hierarchical structure of information recorded on the DVD. A data recording area formed on the DVD has structure as shown in FIG. 1. A logical format of this structure is defined in accordance with, for example, ISO9660 and Universal Disc Format (UDF) bridge.

The data recording area from a read-in area to a read-out area is assigned as a volume space. This volume space can include: a space for volume and file structure information (volume/file structure); a space for applications of DVD standard (DVD video region); and a space for those other than the applications of this standard (other recording area).

The volume space is physically divided into a large number of sectors, to which serial numbers are provided. A logical address of data recorded in this volume space means a logical sector number as defined by the ISO9660 and the UFD bridge.

The volume/file structure region corresponds to a management region defined by the ISO9660 and the UFD bridge. Based on description of this region, contents of a VMG (video manager) are stored into a system microcomputer inside a DVD playback device to be described later. In the VGM, information managing a VTS (Video Title Set) is described.

The VTS includes: VTSI (Video Tile Set Information), VTSM_VOBS (Video Object Set for Video Title Set Menu), VTSTT_VOBS (Video Object Set for Video Title Set Title), and VTSI_BUP (Back Up of Video Title set Information).

Described in the VTSTT_VOBS is an ID number of a cell included in each VOB (video object). Moreover, PGCI (program chain information) is recorded in the VTSI.

In other recording area, information that can be used in the aforementioned VTS or other information not related to the VTS can be recorded. Note that this area is not necessary.

Figure 2:
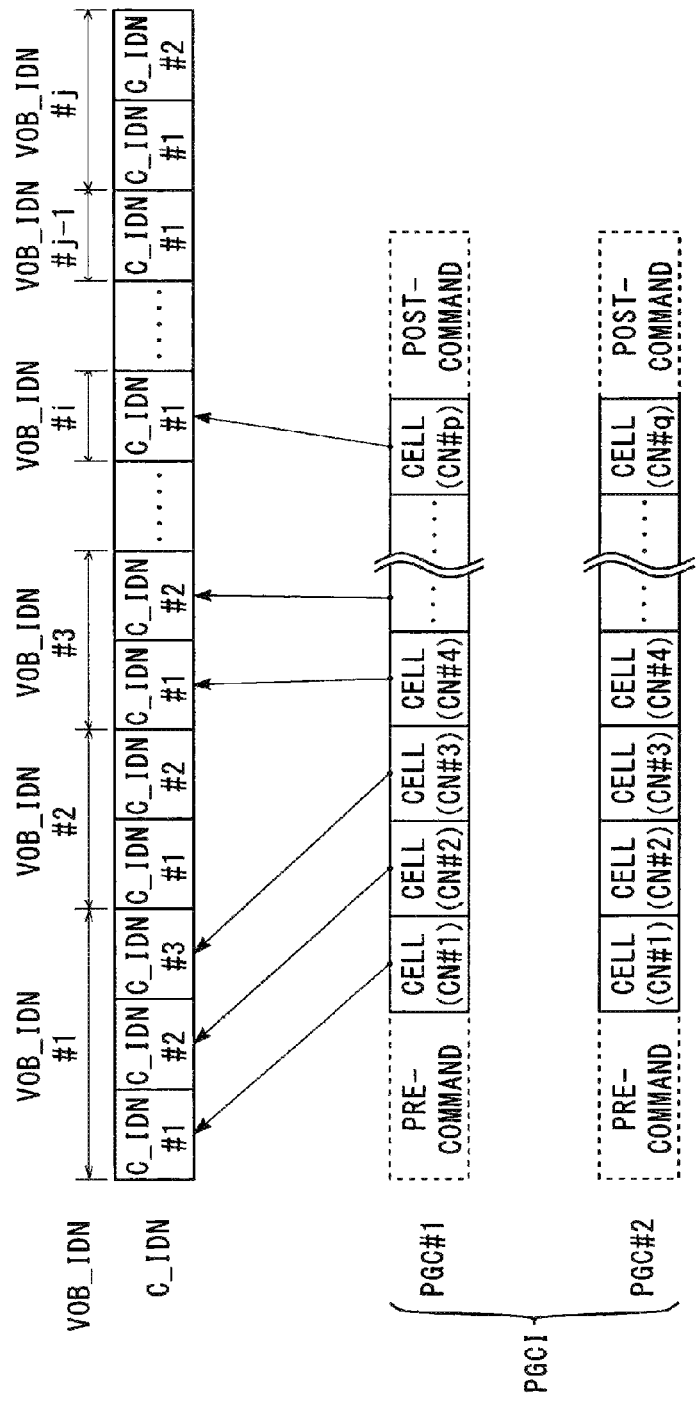
FIG. 2 is a diagram illustrating configuration of PGCI.

FIG. 2 is a diagram illustrating configuration of the PGCI. The PGCI is composed of a plurality of PGCs (program chains), in each of which numbers of cells forming this PGC are recorded. Moreover, in the PGCI, time information including PGC_PB_TM (Program Chain Playback Time) and C_PBTM (Cell Playback Time) is recorded in time codes. The PGC_PB_TM indicates in the time code a total playback time required for playing back a series of cells included in the corresponding PGC, and the C_PBTM indicates in the time code playback time for each cell included in the PGC.

Figure 3:
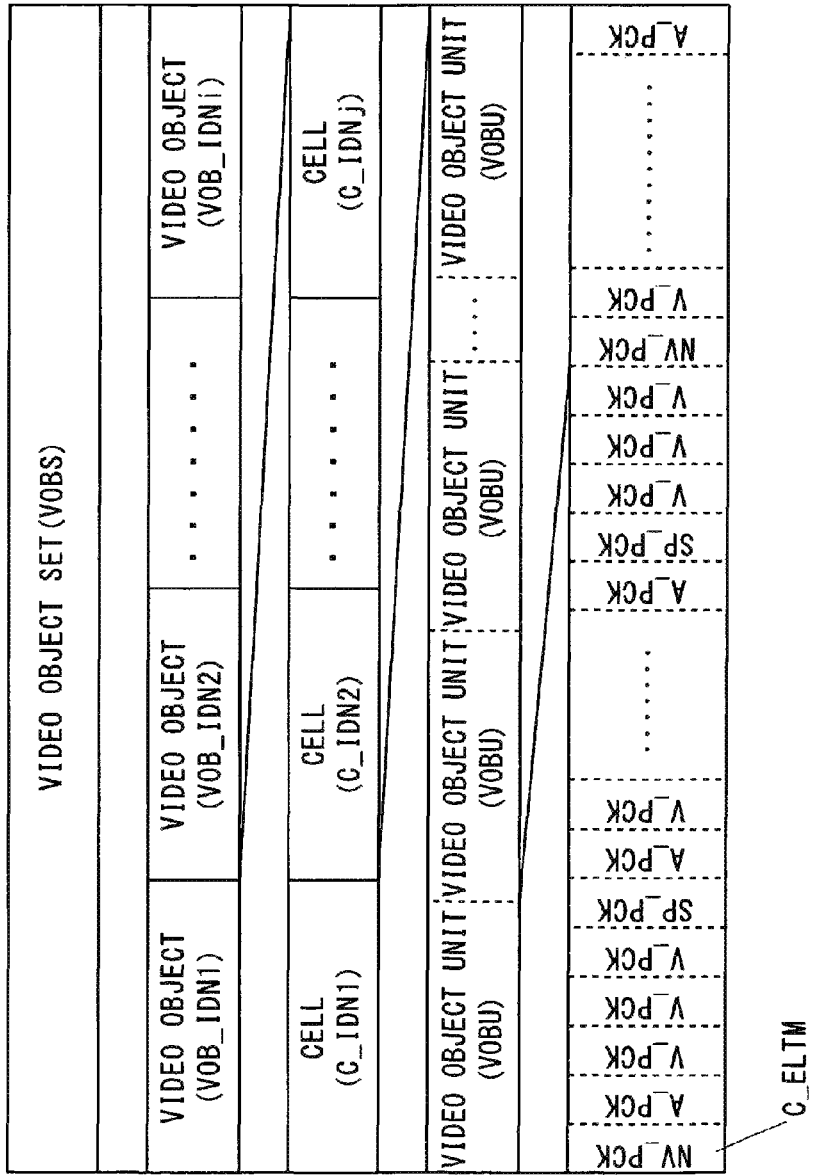
FIG. 3 is a diagram illustrating hierarchical structure of information included in VTSTT_VOBS.

FIG. 3 is a diagram illustrating hierarchical structure of information included in the VTSTT_VOBS. The VOBS (video object set) is composed of a plurality of (i-number in FIG. 3) VOBs. Moreover, the VOB is composed of a plurality of (i-number in FIG. 3) cells. VOB_IDNk in the figure indicates an ID number of a VOB, and C_IDNk indicates an ID number of a cell.

The cell is composed of a plurality of VOBUs (Video Object Units). Then the VOBU is composed of: NV_PCK (Navigation Pack), A_PCK (Audio Pack), V_PCK (Video Pack), and SP_PCK (Subpicture Pack). As shown in FIG. 3, the NV_PCK is arranged only at the top of each VOBU.

In the A_PCK, the V_PCK, and the SP_PCK, audio data, video data, and caption data are respectively and independently recorded after compressed and encoded. The video data of the V_PCK is composed of a plurality of pictures. The picture is one image, which forms one frame. Note that playback is performed in 30 frames/second.

Recorded in the NV_PCK is additional data for smoothly performing processing such as normal playback and special playback, and at least three pieces of time information thereof are recorded therein. One of them is VOBU_S_PTM (Video Object Unit Presentation Start Time), the other one of them is VOBU_E_PTM (Video Object Unit Presentation End Time). They respectively indicate in time stamps playback start time and playback end time of a corresponding VOBU. The other one of them is C_ELTM (Cell Elapse Time), and indicates in a time code playback elapse time of the corresponding VOBU from the top of the cell including it.

Returning to FIG. 1, the read-in area will be described. The read-in area includes an emboss data area and a management information area. Previously recorded in the emboss data area are: a type of a first or second layer as layer information; information related to the entire disc such as a disc type, a disc size, recording density, a physical sector number indicating recording start-end positions; and information related to manufacturing of individual discs.

Moreover, in the management area, management information related to main data is recorded. When the main data is video data, VTS_TMAPT (Video Title Set Time Map Table) is generated as management information. This VTS_TMAPT describes VTS_TMAPT_SA (Video Title Set Time Map Table Top Address) as a top address from the title.

FIG. 4 is a diagram showing a data recording example of VTS_TMAPT. Titles of video data are composed of: TMU (Time Map Unit), RESERVED (Reservation), MAP_EN_Ns (Map Entry Number), MAP_ENT (Map Entry Table). Here, TMU is in seconds, indicating a time interval of MAP_EN_Ns, and its byte count is 1. The byte count of RESERVED is 1, and the byte count of MAP_EN_Ns is 2. Moreover, for MAP_ENT, the byte count is 4×MAP_EN_Ns. MAP_ENT indicates a VOBU of each map entry destination.

Figure 5:
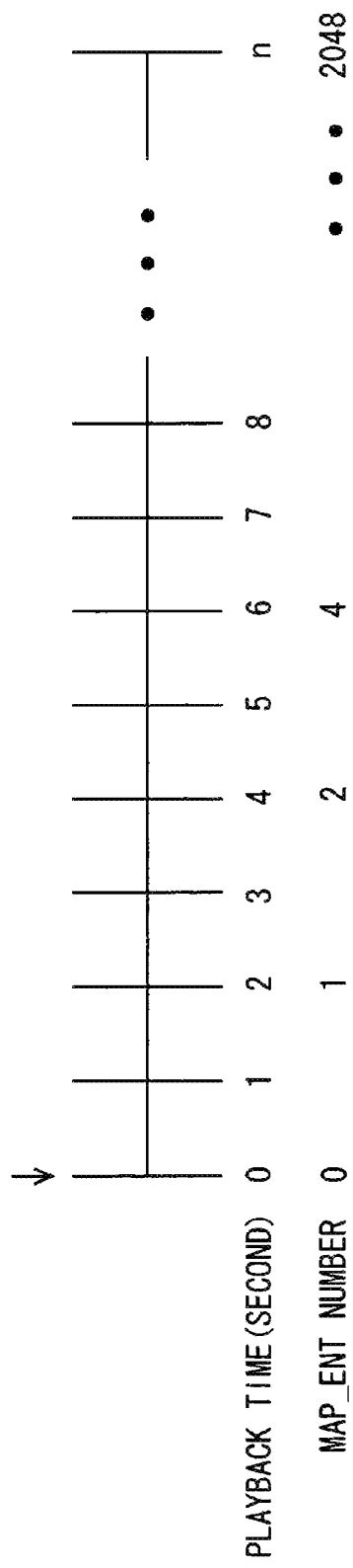
FIG. 5 shows one example of TMU.

FIG. 5 is one example of TMU. In FIG. 5, MAP_EN Ns at the top position of PGC is "0", and playback time defines "0" as a reference point. Here, when TMU is, for example, two-second interval, MAP_EN_Ns is the integral multiple of 2, and can be set up to 2048 at a maximum. Then since the playback time information corresponds to MAP_EN_Ns, it is recorded as 2 seconds when MAP_EN_Ns is 1, as 4 seconds when MAP_EN_Ns is 2, as 6 seconds when MAP_EN_Ns is 4, . . . .

Therefore, address information indicating position of MAP_EN_Ns can be converted into time data. That is, obtaining address information permits recognizing time at its position. On the other hand, the time data can be converted into address information. That is, inputting specified time through time search or the like permits recognizing position at that time.

Figure 6:
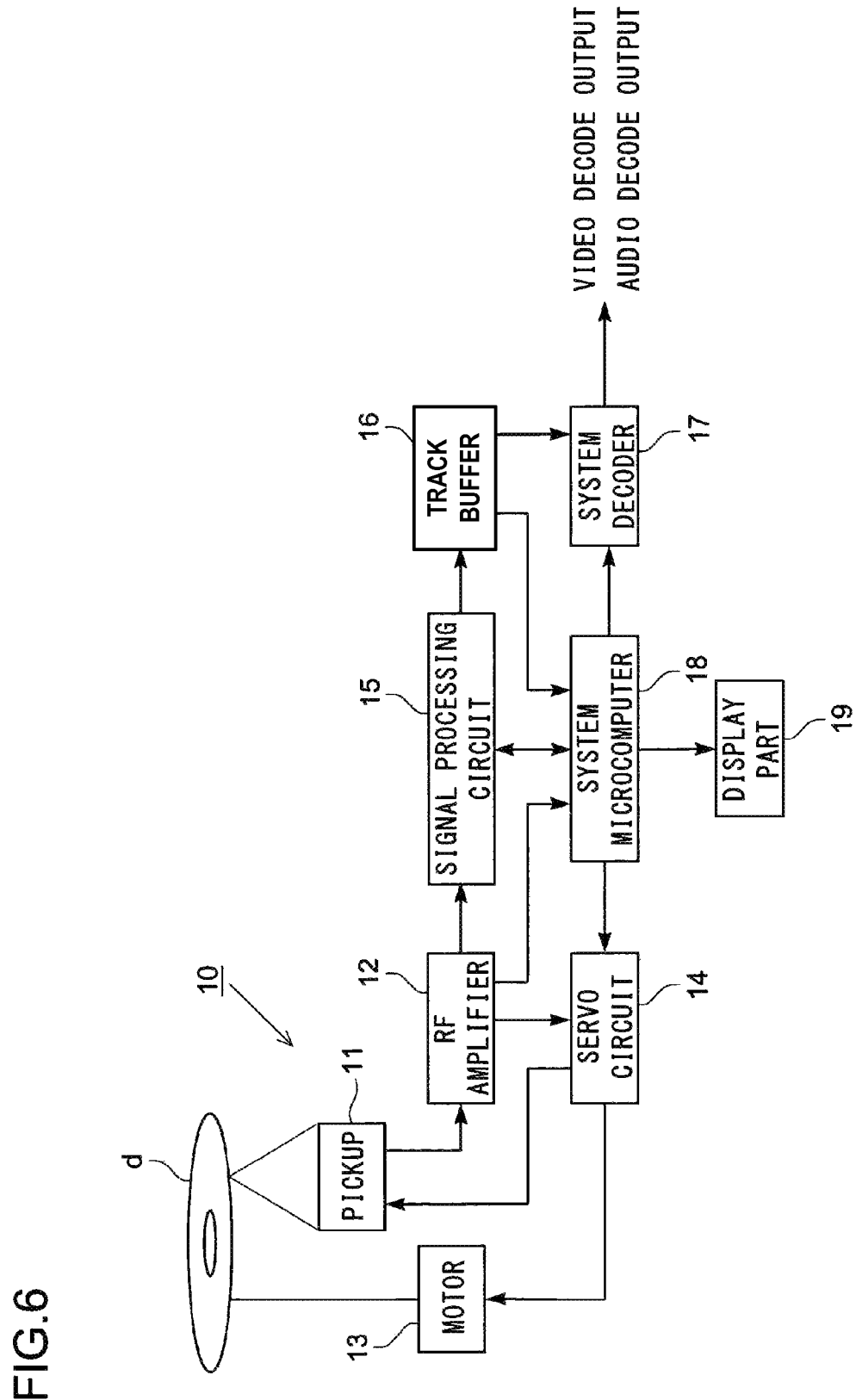
FIG. 6 is a block diagram showing configuration of a DVD playback device of the present invention.

Next, a description will be given, referring to a DVD playback device as one example of an optical disc device. FIG. 6 is a block diagram showing configuration of the DVD playback device 10. The DVD playback device 10 includes: a pickup 11, an RF amplifier 12, a motor 13, a servo circuit 14, a signal processing circuit 15, a track buffer 16, a system decoder 17, a system microcomputer (control part) 18, and a display part 19.

The pickup 11 radiates laser light of a predetermined wavelength toward a recording surface of a disc d, and receives its reflection light and converts it into an electrical signal (reflection light detection signal). Moreover, the pickup 11 supplies this reflection light detection signal to the RF amplifier 12. The pickup 11 is supported in such a manner as to be movable by a predetermined guide shaft or the like in the radial direction of the disc d so that target data can be read from the disc d where appropriate.

The RF amplifier 12 generates from the reflection light detection signal supplied from the pickup 11 an RF signal, a tracking signal, a focus signal, etc. Further, it generates a binary signal obtained by data-slicing the RF signal. The RF amplifier 12 supplies the generated tracking signal, etc. to the servo circuit 14, and also supplies the generated binary signal as a playback signal to the signal processing circuit 15.

The motor 13 is formed of a spindle motor or the like for rotating a predetermined turn table loaded with the disc d. The motor 13 is controlled by the servo circuit 14, and drives the disc d into rotation so that, for example, the linear speed becomes constant.

The servo circuit 14 drives and controls the motor 13, and drives it into rotation at a predetermined rotation speed. Moreover, the servo circuit 14 drives and controls a sled motor (not shown) by the tracking signal or the like supplied from the RF amplifier, and moves the pickup 11 in the radial direction of the disc d where appropriate.

The signal processing circuit 15 demodulates the playback signal supplied from the RF amplifier 12, and then performs error correction, etc. The signal processing circuit 15 sequentially supplies to the track buffer 16 demodulated data obtained through this demodulation or the like The track buffer 16 is formed of a RAM of a predetermined capacity and sequentially stores the demodulated data supplied from the signal processing circuit 15. The demodulated data stored in the track buffer 16 is sequentially supplied to the system decoder 17.

The system decoder 17 decodes the demodulated data supplied from the track buffer 16 and generates video data, audio data, etc. The system decoder 17 supplies to a predetermined AV amplifier or the like the generated video data, audio data, etc.

The system microcomputer 18 is formed of a one-chip micro computer or the like provided with, for example, a ROM, a RAM, and a CPU, and controls the entire DVD playback device 10. The system microcomputer 18 controls the servo circuit 14, etc. to obtain PGCI previously recorded on the disc d and stores it into its own RAM or the like. Then it executes PGC operation of reading a target cell in accordance with the stored PGCI.

More specifically, the system microcomputer 18, upon executing the PGC operation, obtains NV_PCK as playback management information of the aforementioned VOBU forming the cell, and plays back the target data (VOBU) from the disc d in accordance with this NV-PCK. Specifically, the system microcontroller 18, after obtaining the NV_PCK, sets an address of the target data targeted for reading, controls the servo circuit 14 and the like, and searches for the target data with the set address. Then it reads the searched target data from the disc d, controls the signal control circuit 15, performs demodulation, error correction, etc. on the read target data (playback signal), and stores the demodulated data into the track buffer 16. The system microcomputer 18 repeatedly performs in accordance with free space of the track buffer 16, etc. a series of operations including these address setting, searching, reading, demodulation, error correction, data storage, etc.

Moreover, in parallel with theses operations, the system microcomputer 18 controls the system decoder 17 to decode the demodulated data stored in the track buffer 16, and sequentially plays back the video data, audio data, etc.

The display part 19 is formed of an LCD (Liquid Crystal Display) panel or the like, and displays operating condition of the DVD playback device 10, etc.

Figure 7:
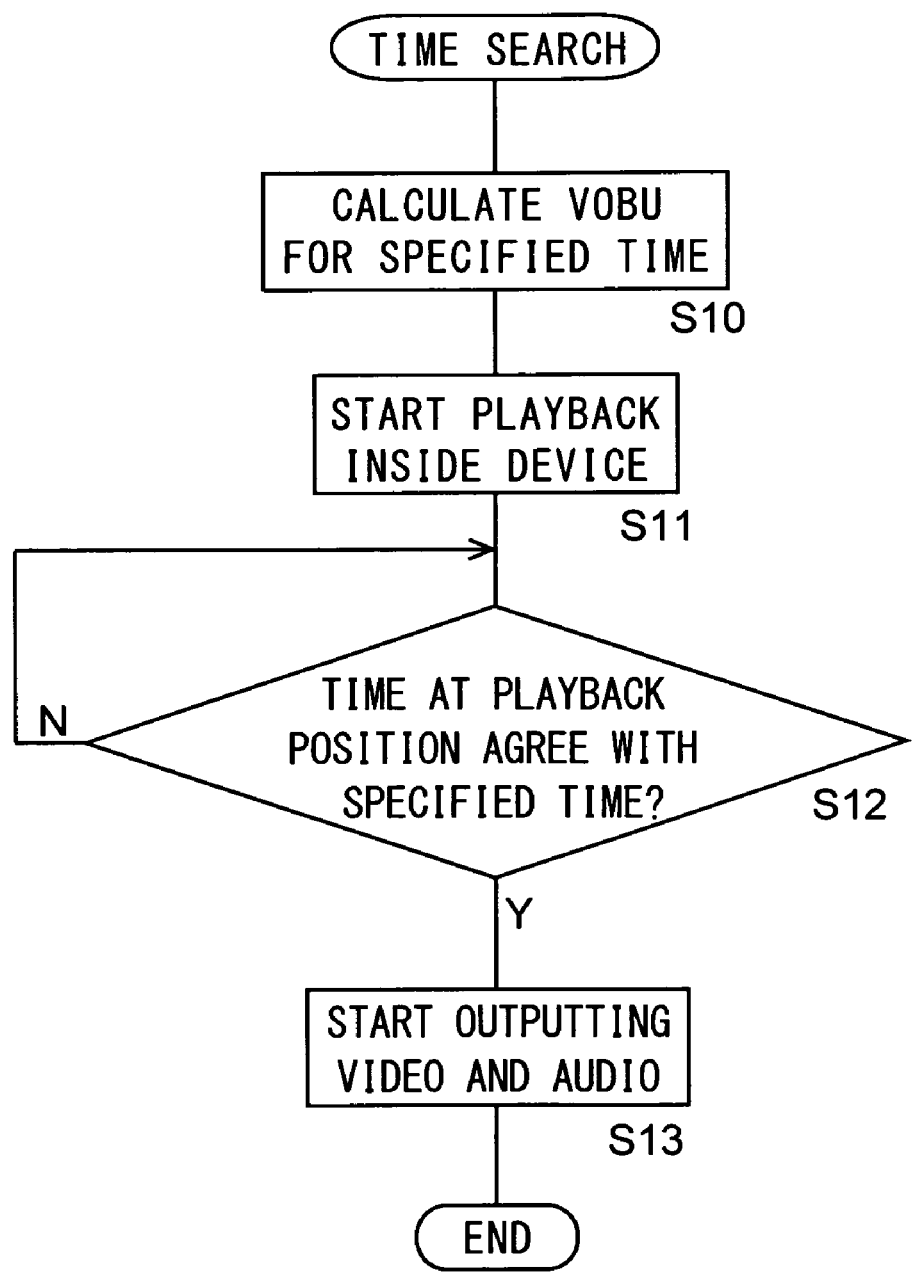
FIG. 7 is a flowchart showing one example of operation during time search in the DVD playback device of the invention.

Next, the operation of the DVD playback device 10 will be described. FIG. 7 is a flowchart showing one example of operation during time search in the DVD playback device 10. When the specified time for time search is inputted by the user, that is, when playback position is temporally specified, in step S10, the system microcontroller 18 calculates, by using VTS_TMAPT, VOBU including the specified time. More specifically, MAP_EN_Ns can be obtained by dividing the specified time by TMU to obtain a top address of VOBU corresponding thereto.

Next, proceeding to step S11, the system microcomputer 18 starts playback from the top of this VOBU. The playing back inside the device 10 means reading at least the video and audio data from the DVD, and performing up to the operations of decoding is permitted. That is, it refers to a state in which the video and audio are stopped at the system decoder 17 without being outputted. Note that the video and audio not to be outputted are sequentially discarded.

Next, proceeding to step S12, the system microcomputer 18 judges whether or not time at playback position where the playback is performed inside the device 10 agrees with the specified time. For this end, elapse time per frame can be added to time at the top of the VOBU with which the playback has been started to judge whether or not it agrees with the specified time. Since one frame corresponds to 1/30 seconds, it can easily be calculated what frame corresponds to time agreeing with the specified time.

Then proceeding to step S13, the system microcomputer 18, from the time when the frame agreeing with the specified time is started to be played back, outputs this frame and an audio corresponding thereto. That is, outputting is started from the system decoder 17. For OSD display of the playback elapse time, simultaneously with the start of outputting a video and an audio, the same time as the specified time can be outputted to update the time whenever necessary.

For example, when the specified is 1h00m00s00f (1 hour 0 minute 0 second 0 frame) and the top of VOBU including this specified time is 0h59m59s17f, the playback inside the device 10 is started from the 0h59m59s17f, and when the playback position at 1h00m00s00f has been reached, the video and audio is started to be outputted. For OSD display of the playback elapse time, simultaneously with the start of outputting the video and audio, OSD at 1h00m00s is outputted.

In this manner, in time search control, the playback inside the device 10 is started from the top of VOBU including the specified time and the video and audio is started to be outputted from the time when the time at the playback position agrees with the specified time, whereby those conventionally time-searched in units of VOBUs can be time-searched in units of frames as minimum units.

Therefore, without compensating a difference between the specified time and actual playback start time by such processing that deludes OSD display as has been conventionally practiced, the video and audio can be outputted from accurate specified time, thus permitting achieving more accurate time search. As a result, the sense of use improves, which permits improvement in the user satisfaction level.

The invention can be applied to an optical disc device that has as a recording medium an optical disc such as a DVD, a BD, an HD, a DVD, or the like.

What is claimed is:

1. An optical disc device comprising a time search part configured to execute function of performing playback from specified time, the optical disc device further comprising a computer-executable control part that, when the specified time for the time search has been inputted, causes playback inside the device to be started from a top of a Video Object Unit (VOBU) including the specified time, and causes outputting a video and an audio to be started from time when time at playback position agrees with the specified time, wherein
    simultaneously with the start of outputting the video and audio, On Screen Display (OSD) indicating playback elapse time, which is equal to the specified time, is outputted to update the playback elapse time where necessary.

2. The optical disc device according to claim 1,
wherein when the time at the playback position agrees with the specified time corresponds to when a playback frame agrees with a frame corresponding to the specified time.

3. The optical disc device according to claim 1,
wherein the Video Object Unit (VOBU) including the specified time is calculated by using Video Title Set Time Map Table (VTS_TMAPT).

4. The optical disc device according to claim 2,
wherein the Video Object Unit (VOBU) including the specified time is calculated by using Video Title Set Time Map Table (VTS_TMAPT).

* * * * *